(12) United States Patent
Eiriksson et al.

(10) Patent No.: US 7,760,733 B1
(45) Date of Patent: Jul. 20, 2010

(54) FILTERING INGRESS PACKETS IN NETWORK INTERFACE CIRCUITRY

(75) Inventors: Asgeir Thor Eiriksson, Sunnyvale, CA (US); Chris Yuhong Mao, Fremont, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 1114 days.

(21) Appl. No.: 11/250,894

(22) Filed: Oct. 13, 2005

(51) Int. Cl.
H04L 12/28 (2006.01)

(52) U.S. Cl. .................................. 370/392; 370/395.42
(58) Field of Classification Search ........................ None
See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,497,476 A | 3/1996 | Oldfield et al. | |
| 5,778,189 A | 7/1998 | Kimura et al. | |
| 6,087,581 A | 7/2000 | Emmer et al. | |
| 6,226,680 B1 | 5/2001 | Boucher et al. | 709/230 |
| 6,240,094 B1 | 5/2001 | Schneider | |
| 6,247,060 B1 | 6/2001 | Boucher et al. | 709/238 |
| 6,334,153 B2 | 12/2001 | Boucher et al. | 709/230 |
| 6,389,479 B1 | 5/2002 | Boucher et al. | 709/243 |
| 6,393,487 B2 | 5/2002 | Boucher et al. | 709/238 |
| 6,397,316 B2 | 5/2002 | Fesas, Jr. | |
| 6,401,177 B1 | 6/2002 | Koike | |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,470,415 B1 | 10/2002 | Starr et al. | 711/104 |
| 6,510,164 B1 | 1/2003 | Ramaswamy et al. | |
| 6,591,302 B2 | 7/2003 | Boucher et al. | 709/230 |
| 6,594,268 B1 * | 7/2003 | Aukia et al. | 370/400 |
| 6,625,671 B1 | 9/2003 | Collette et al. | |
| 6,658,480 B2 | 12/2003 | Boucher et al. | 709/239 |
| 6,681,244 B1 | 1/2004 | Cross et al. | |
| 6,687,758 B2 | 2/2004 | Craft et al. | 709/250 |
| 6,697,868 B2 | 2/2004 | Craft et al. | 709/230 |
| 6,701,372 B2 | 3/2004 | Yano et al. | |
| 6,708,223 B1 | 3/2004 | Wang et al. | |
| 6,708,232 B2 | 3/2004 | Obara | |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner*—Phirin Sam
(74) *Attorney, Agent, or Firm*—Beyer Law Group LLP (57) ABSTRACT

Transfer of data is facilitated between at least one peer application and a host, via a network and network interface circuitry associated with the host. That is, data destined for the host is provided from the peer to the network interface circuitry via the network. The NIC has the capability to offload the processing of data provided according to particular protocols. In addition, based on characteristics of the data, a filtering rule associated with those characteristics may be applied to the data prior to providing the data to the host. When there are a plurality of filter rules associated with characteristics of the data, in some examples, it is automatically determined which one of the plurality of filter rules associated with characteristics of the data to apply to the data.

25 Claims, 4 Drawing Sheets

U.S. PATENT DOCUMENTS

| | | | |
|---|---|---|---|
| 6,717,946 B1* | 4/2004 | Hariguchi et al. | 370/392 |
| 6,751,665 B2 | 6/2004 | Philbrick et al. | 709/224 |
| 6,757,245 B1 | 6/2004 | Kuusinen et al. | |
| 6,757,746 B2 | 6/2004 | Boucher et al. | 709/250 |
| 6,792,502 B1* | 9/2004 | Pandya et al. | 711/108 |
| 6,798,743 B1* | 9/2004 | Ma et al. | 370/235 |
| 6,807,581 B1 | 10/2004 | Starr et al. | 709/250 |
| 6,813,652 B2 | 11/2004 | Stadler et al. | |
| 6,862,648 B2 | 3/2005 | Yatziv | |
| 6,925,055 B1 | 8/2005 | Erimli et al. | |
| 6,941,386 B2 | 9/2005 | Craft et al. | 709/250 |
| 7,031,267 B2* | 4/2006 | Krumel | 370/255 |
| 7,093,099 B2 | 8/2006 | Bodas et al. | |
| 7,114,096 B2 | 9/2006 | Freimuth et al. | |
| 7,133,902 B2 | 11/2006 | Saha et al. | |
| 7,133,914 B1 | 11/2006 | Holbrook | |
| 7,191,318 B2 | 3/2007 | Tripathy et al. | |
| 7,239,642 B1 | 7/2007 | Chinn et al. | |
| 7,254,637 B2 | 8/2007 | Pinkerton et al. | |
| 7,260,631 B1 | 8/2007 | Johnson et al. | |
| 7,284,047 B2 | 10/2007 | Barham et al. | |
| 7,313,623 B2 | 12/2007 | Elzur et al. | |
| 7,376,147 B2 | 5/2008 | Seto et al. | |
| 7,408,906 B2 | 8/2008 | Griswold et al. | |
| 7,453,892 B2 | 11/2008 | Buskirk et al. | |
| 7,474,670 B2* | 1/2009 | Nowshadi | 370/462 |
| 7,493,427 B2 | 2/2009 | Freimuth et al. | |
| 7,583,596 B1* | 9/2009 | Frink | 370/230.1 |
| 2001/0010046 A1 | 7/2001 | Muyres et al. | |
| 2001/0021949 A1 | 9/2001 | Blightman et al. | 709/219 |
| 2001/0036196 A1 | 11/2001 | Blightman et al. | 370/465 |
| 2001/0037406 A1 | 11/2001 | Philbrick et al. | 709/250 |
| 2002/0039366 A1 | 4/2002 | Sano | |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0156927 A1 | 10/2002 | Boucher et al. | 709/250 |
| 2002/0161919 A1 | 10/2002 | Boucher et al. | 709/238 |
| 2003/0018516 A1 | 1/2003 | Ayala et al. | |
| 2003/0035436 A1 | 2/2003 | Denecheau et al. | |
| 2003/0140124 A1 | 7/2003 | Burns | 709/220 |
| 2003/0200284 A1 | 10/2003 | Philbrick et al. | 709/219 |
| 2003/0204631 A1 | 10/2003 | Pinkerton et al. | |
| 2004/0003094 A1 | 1/2004 | See | |
| 2004/0003126 A1 | 1/2004 | Boucher et al. | 709/250 |
| 2004/0028069 A1 | 2/2004 | Tindal et al. | |
| 2004/0030745 A1 | 2/2004 | Boucher et al. | 709/203 |
| 2004/0042487 A1 | 3/2004 | Ossman | |
| 2004/0054813 A1 | 3/2004 | Boucher et al. | 709/250 |
| 2004/0062245 A1 | 4/2004 | Sharp et al. | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064597 A1 | 4/2004 | Starr et al. | 709/250 |
| 2004/0073703 A1 | 4/2004 | Boucher et al. | 709/245 |
| 2004/0078480 A1 | 4/2004 | Boucher et al. | 709/237 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0158793 A1 | 8/2004 | Blightman et al. | 714/758 |
| 2004/0165592 A1 | 8/2004 | Chen et al. | |
| 2004/0190533 A1 | 9/2004 | Modi et al. | |
| 2004/0199808 A1 | 10/2004 | Freimuth et al. | |
| 2004/0213235 A1 | 10/2004 | Marshall et al. | |
| 2004/0240435 A1 | 12/2004 | Craft et al. | 709/250 |
| 2005/0071490 A1 | 3/2005 | Craft et al. | 709/230 |
| 2005/0083935 A1* | 4/2005 | Kounavis et al. | 370/392 |
| 2005/0120037 A1 | 6/2005 | Maruyama et al. | |
| 2005/0122986 A1 | 6/2005 | Starr et al. | 370/412 |
| 2005/0125195 A1 | 6/2005 | Brendel | |
| 2005/0135378 A1 | 6/2005 | Rabie et al. | |
| 2005/0135396 A1* | 6/2005 | McDaniel et al. | 370/412 |
| 2005/0135412 A1* | 6/2005 | Fan | 370/463 |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259644 A1 | 11/2005 | Huitema et al. | |
| 2005/0259678 A1 | 11/2005 | Gaur | |
| 2005/0289246 A1 | 12/2005 | Easton et al. | |
| 2006/0031524 A1 | 2/2006 | Freimuth | |
| 2006/0039413 A1 | 2/2006 | Nakajima et al. | |
| 2006/0075119 A1 | 4/2006 | Hussain | |
| 2006/0080733 A1* | 4/2006 | Khosmood et al. | 726/13 |
| 2006/0133267 A1 | 6/2006 | Alex et al. | |
| 2006/0168649 A1 | 7/2006 | Venkat et al. | |
| 2006/0206300 A1 | 9/2006 | Garg et al. | |
| 2006/0209693 A1 | 9/2006 | Davari et al. | |
| 2006/0221946 A1 | 10/2006 | Shalev et al. | |
| 2006/0281451 A1 | 12/2006 | Zur | |
| 2007/0064737 A1 | 3/2007 | Williams | |
| 2007/0070901 A1* | 3/2007 | Aloni et al. | 370/230 |
| 2007/0110436 A1 | 5/2007 | Bennett | |
| 2007/0201474 A1 | 8/2007 | Isobe | |
| 2008/0002731 A1 | 1/2008 | Tripathi et al. | |
| 2008/0016511 A1 | 1/2008 | Hyder et al. | |
| 2008/0043750 A1 | 2/2008 | Keels et al. | |
| 2008/0232386 A1 | 9/2008 | Gorti et al. | |

OTHER PUBLICATIONS

Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf, Oct. 1990.

Rütsche et al., "*TCP/IP on the Parallel Protocol Engine*," High Performace Networking, (IV, C-14), Elsevier Science Publishers, B.V. North Holland 1993.

Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols*," http://www.hpl.hp.com/techreports/93/HPL-93-46.pdf, Jul. 1993, 18 Pages.

TRM Technologies, Inc., "*L4/L7 Switching*," Downloaded from http://www.trm.ca/pages/t-tech7.html on Feb. 16, 2006, 3 Pages.

Madsen et al., "*Wireless Data Communication*," Fall 2003 Presentation, Wireless Networks Division (WING), Allborg University.

Yocum et al., "*Anypoint: Extensible Transport Switching on the Edge*," Proceedings of the 4th USENIX Symposium on Internet Technologies and Systems, Mar. 26-28, 2003, Seattle, WA, USA.

International Search Report in PCT/US02/12679, dated Jul. 23, 2002.

Office Action in U.S. Appl. No. 10/474,500, mailed Oct. 4, 2007.

Office Action in U.S. Appl. No. 11/137,146, mailed Mar. 5, 2008.

Office Action in U.S. Appl. No. 11/137,140, mailed Feb. 5, 2008.

Notice of Allowance in U.S. Appl. No. 10/474,500, mailed Jul. 1, 2008.

Allowed Claims from U.S. Appl. No. 10/474,500.

Office Action in U.S. Appl. No. 11/217,661, mailed Sep. 18, 2008.

Office Action in U.S. Appl. No. 11/313,003, mailed Aug. 22, 2008.

Office Action in U.S. Appl. No. 11/330,898, mailed Oct. 8, 2008.

Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/137,140 mailed Apr. 1, 2009.
Office Action in U.S. Appl. No. 11/130,898 mailed Apr. 2, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue , 2001 pp. 67-76 vol. 1.

Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Notice of Allowance in U.S. Appl. No. 11/356,850, mailed Jun. 26, 2009.
Allowed Claims from U.S. Appl. No. 11/356,850.
Office Action in U.S. Appl. No. 11/282,933, mailed Sep. 9, 2009.
Notice of Allowance in U.S. Appl. No. 11/330,898, mailed Sep. 23, 2009.
Allowed Claims in U.S. Appl. No. 11/330,898.
Final Office Action in U.S. Appl. No. 11/747,790, mailed Nov. 5, 2009.

* cited by examiner

FILTERING INGRESS PACKETS IN NETWORK INTERFACE CIRCUITRY

TECHNICAL FIELD

The present invention relates to a method and apparatus to implement ingress packet filtering (including optional re-writing) in network interface circuitry associated with a host computer. The filtering is based on matching explicit properties of ingress packets (one or more packet header fields) with associated filtering rules. This is in contrast to matching implicit properties of the ingress packets, such as properties of a connection with which an ingress packet is associated. The filtering rules have associated with them actions that may include, for example, accept, accept with re-write, and reject of a particular packet. The universe of filtering rules may be complete such that that every ingress packet that is not for connection that is offloaded to the network interface circuitry is processed according to some filtering rule.

BACKGROUND

Filtering of data communicated over a network to a host is known. Typically, such filtering occurs either as part of processing by the host computer (e.g., the netfilter capability of Linux) or on equipment somewhat disassociated with the host computer (such as a switch or a firewall appliance).

SUMMARY

Transfer of data is facilitated between at least one peer application and a host, via a network and network interface circuitry associated with the host. That is, data destined for the host is provided from the peer to the network interface circuitry via the network. The network interface circuitry has the capability to offload the processing of data provided according to particular protocols. In addition, based on characteristics of the data, a filtering rule associated with those characteristics may be applied to the data prior to providing the data to the host. When there are a plurality of filter rules associated with characteristics of the data, in some examples, it is automatically determined which one of the plurality of filter rules associated with characteristics of the data to apply to the data.

The data provided to the network interface circuitry may be in packet form. Filtering action according to a filter rule may include passing a packet to the host with or without modifications to the packet contents, rejecting the packet (i.e., dropping both header portion(s) and packet payload). In the case of a packet provided according to an offloaded protocol, the filtering action may include processing the packet according to protocol processing rules for the offloaded protocol.

DETAILED DESCRIPTION

According to some conventional systems, a protocol processing stack is offloaded from a host to intelligent network interface circuitry (such as a Network Interface Card, or "NIC"). The intelligent network interface circuitry is a data link layer interface between the host computer and the network. For example, communication across the network may be Ethernet protocol at the data link layer and the intelligent network interface circuitry has one or more MAC addresses associated with it. In one example, the intelligent network interface circuitry is configured to apply protocol processing to Transmission Control Protocol (TCP) packets having a particular Internet Protocol (IP) destination address, and being destined for a particular TCP port number. Thus, the conventional offload intelligent network interface circuitry, in some sense, "filters" packets arriving to the intelligent network interface circuitry from the network. That is, packets are associated with particular connections based on protocol type and packet header characteristics (e.g., for TCP/IP offload, matching the 4-tuple in the header). However, the filtering action association is with a particular connection. Such processing is implicitly a function of the connection state as indicated, for example, in a TCB (Transmission Control Block) maintained by the intelligent offload circuitry.

Particularly when the intelligent interface circuitry is configured to process packets of connections offloaded from the host computer, it is advantageous to perform filtering in the intelligent interface circuitry on packets that are not of the offloaded connections. That is, since the packets headers are already being evaluated to determine if the packets are of offloaded connections, little (if any) additional processing is required in the intelligent interface circuitry to match the packets with filtering actions.

In the example discussed below, the intelligent network interface circuitry is capable of filtering (including rewriting) data (e.g., in packets) arriving from a peer via a network, and nominally destined to the host with which the intelligent network interface circuitry is associated, according to a flexible set of filtering rules. In some examples, the intelligent network interface circuitry may further have capability to offload protocol processing for some protocols. For example, the intelligent network interface circuitry may have the capability to offload protocol processing from the host for the TCP protocol.

As one example, as a result of the filtering rules, and an additional capability to dynamically update the filtering rules, the intelligent network interface circuitry can, in conjunction with control software running on the host, efficiently implement a high-capability firewall. For example, the firewall can be configured to defend against denial of service attacks, enforce tight port access controls, drop packets with a particular protocol type, drop packets arriving from a particular IP address, etc.

Furthermore, filtering rules may be rewrite rules for packets to be accepted. In this case, the intelligent network interface circuitry can, for example, efficiently implement a load balancer such that incoming packets are distributed across a pool of host server computers. In another example, a Network Address Translation (NAT) device can be efficiently implemented.

Figure 1:
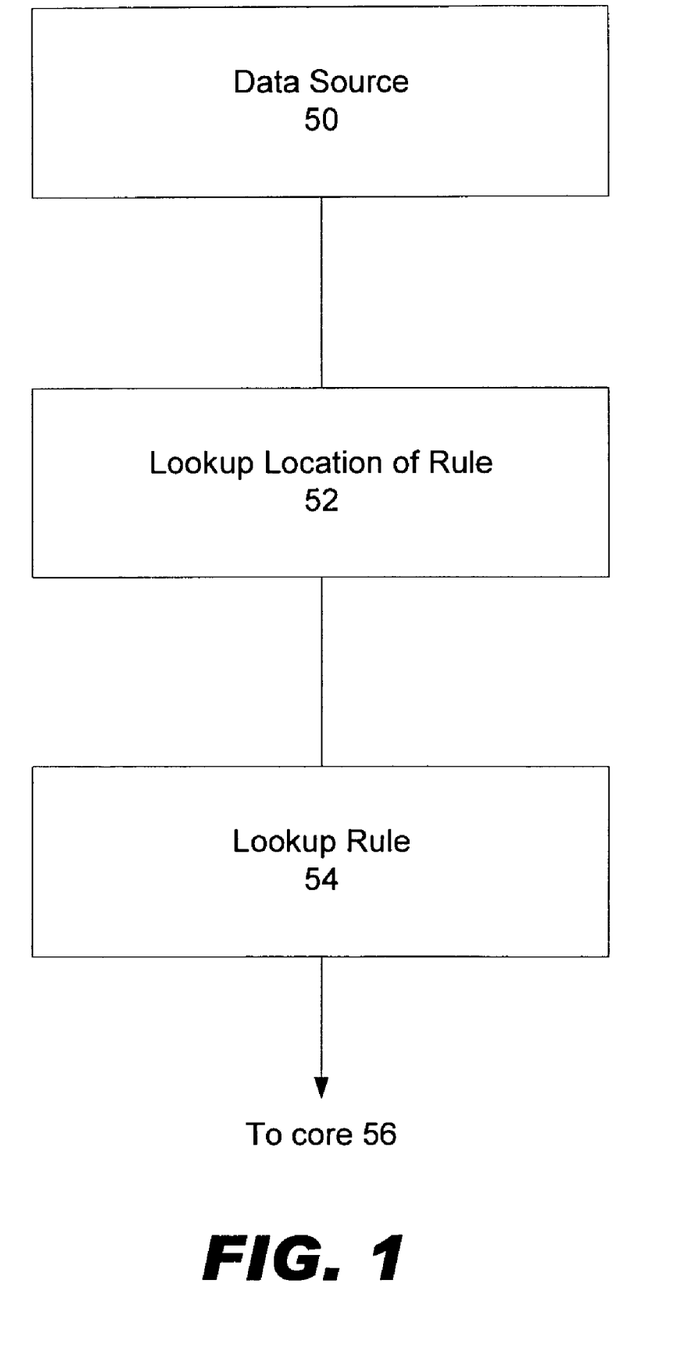
FIG. 1 illustrates an architecture of a flow processor to handle protocol offload processing and including per ingress packet filtering

FIG. 1 broadly illustrates one example of intelligent network interface circuitry architecture to apply filtering rules within the processing pipeline of the intelligent network interface circuitry. The data source 50 represents a source of data received from a peer via a network. For example, the data source 50 may represent a 10 Gbps Ethernet network. A filtering rule lookup block 52 processes input data to determine the location of a filtering rule corresponding to characteristics of the input data. For example, the input data may be a data packet, and the filtering rule lookup block 52 accesses a filtering rule map to determine a location in a filtering rule database of a filtering rule according to one or more of the header fields of the input data packet.

At block 54, the filter rule is obtained based on the determined location. There may be one or more nested headers in an input data packet. Where the packet is received according to an Ethernet protocol, for example, a layer-2 (L2) packet such as an ARP packet only has an Ethernet header, but a packet such as a layer-3 (L3) ICMP packet has an Ethernet header and, immediately following the Ethernet header, an IP header. As another example, for a non-fragmented layer-4 (L4) TCP packet, a TCP header immediately follows an L3 IP header, that immediately follows an L2 Ethernet header. The lookup device 52 can, in principle, process all of the L2, L3, and L4 header fields. In some examples, in the interest of efficiency of operation, only a subset of header fields, less than all the header fields, is used.

Broadly speaking, in accordance with one aspect, the filtering rules apply an accept/reject action to each received packet. For an offloaded protocol, such as TCP, a data packet that is a connect (SYN) request may result in a lookup of a listening server and, if such a listening server is not available, will further result in lookup of a filter rule. More specifically, the listening server indicates that connect requests to the destination IP address and TCP port number contained in the TCP/IP header of the connect (SYN) request should be offloaded to the network interface circuitry.

The connect request will typically still be processed by the host in a request/response manner. An offloaded protocol packet that is not a connect request will result in lookup of a location of a control block ("CB," i.e., a control block that represents the connection state) for a corresponding offloaded connection. If such a control block does not exist, then an attempt will be made to find the location of a control block for a filtering rule. This way, it remains optional to offload connections for protocols that can be offloaded. That is, in the case where a connection is offloaded to the network interface circuitry, the connection state and protocol processing rules are in control of the processing, even if filter rules corresponding to the packet characteristics exist. On the other hand, if the connection is not offloaded, a data packet for that same connection is filtered and either rejected or passed to the host computer.

For a packet that is accepted according to a filtering rule, the control block corresponding to the filtering rule may optionally specify one or more actions to modify the packet before providing it to the host computer. In one example, the action(s) may specify rewriting the destination IP address (LIP) and the destination port number (LP) which, in addition, results in recomputation of the IP header checksum, and of the UDP and TCP payload checksums for UDP and TCP packets, respectively.

The filtering and rewrite rules are dynamic to support cases such as a firewall temporarily opening access for certain source IP addresses (FIP) to a certain local port (LP) or a range of port numbers. To support this capability, in one example, the update of the filtering and rewrite rules can be accomplished atomically. In other words, multiple filter-rule database writes and CB writes can be executed without other particular operations, such as filter-rule reads, being interleaved between the writes. In this way, it is guaranteed that the filter rules and/or CB's are only read when they are in a consistent state.

We now describe a processing pipeline of a specific example of network interface circuitry. While the architecture in the described example is a flow processor architecture, other architectures (perhaps not even processors) may be employed. Furthermore, while filter rule matching in the described example is accomplished using a Ternary Content Addressable Memory (TCAM), other architecture (for example, hash functions or search trees) may be employed.

Figure 2:
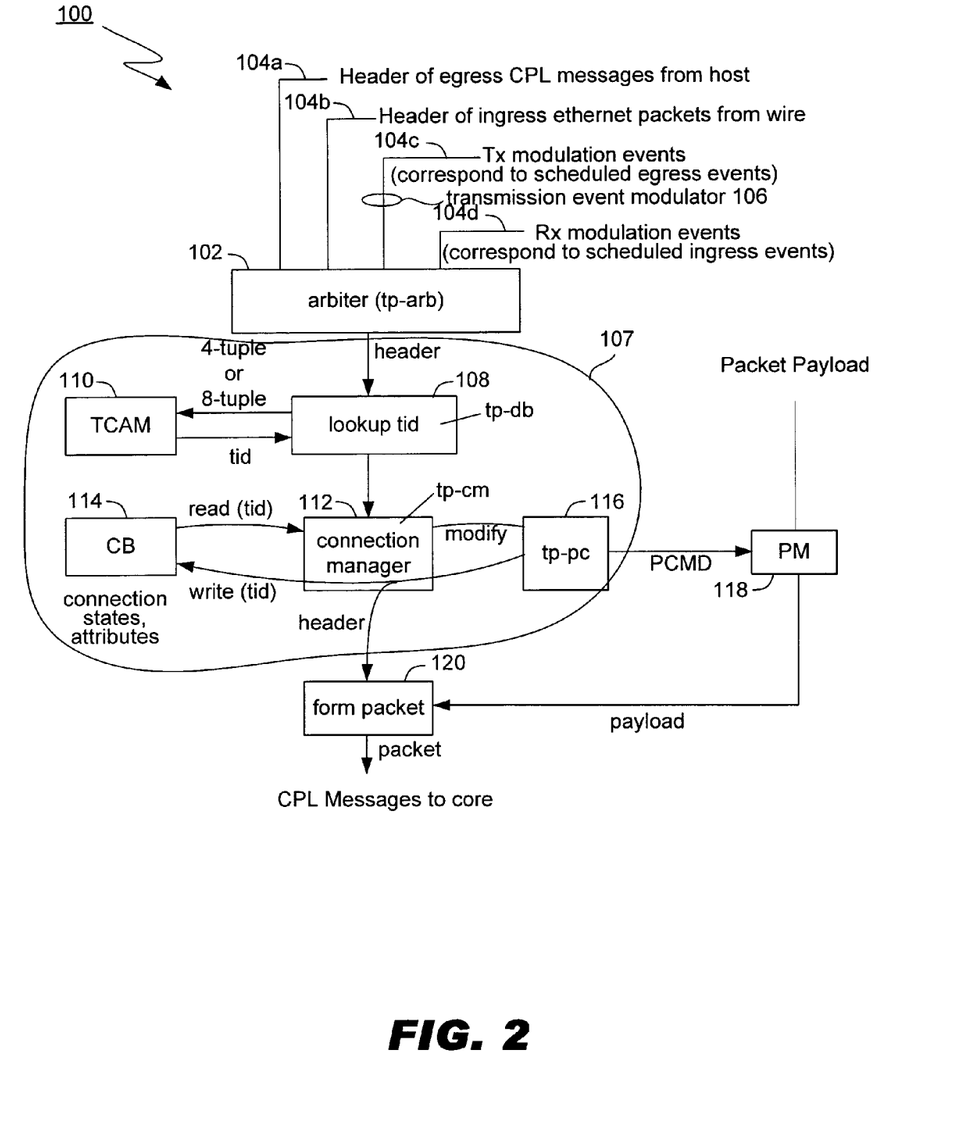
FIG. 2 illustrates the operation of the filter rule locator unit implemented with a TCAM memory.

Turning now to FIG. 2, the flow processor architecture of the interface device 100, having an ingress filtering capability, is described. An arbiter 102 arbitrates among various signals, such as headers of control messages from a host (104a), data packets from the physical wire of the network (104b), transmission modulation event tokens (104c), and receive modulation event tokens (104d).

It is noted that the arbiter 102 is a feature of the particular flow processor architecture of the FIG. 2 device and would typically have only an indirect effect on the filtering capability. Further it is noted that the arbiter 102 has features that allows the atomic update, as a result of processing in the host, of the filter rule database within the TCAM 110 and the CB 114. This may be accomplished, for example, in the following fashion: A CPL_BARRIER message from the host is queued at the host arbiter input 104a, and following the CPL_BARRIER message is a sequence of CPL_WRITE_TCAM (a.k.a., CPL_PASS_OPEN_REQ) and CPL_SET_TCB_FIELD messages, followed by one CPL_BARRIER message. When the arbiter 102 operates to allow a host CPL message through and the message allowed through is a CPL_BARRIER message, the arbiter 102 will then only allow through host CPL messages, until another CPL_BARRIER message is provided by the host. Because the processing pipeline 107 maintains the ordering of the messages being processed, the result is an atomic update of the filtering rules and the CB blocks without any possibility of other messages/packets seeing a partially updated filtering rule database or partially updated CB blocks.

When the arbiter 102 operates to allow an ingress Ethernet packet through (at input 104b), the protocol header of the ingress packet is provided to the protocol processing block 107.

The protocol processing block 107 includes a lookup block 108. A packet is identified by the header or headers contained by the packet. As an example, an Ethernet packet includes at least an L2 Ethernet header, and when the Ethernet packet encapsulates IP packets, the packet also includes an L3 IP header. When the IP header encapsulates an L4 TCP (or UDP) protocol, the packet also contains a TCP (UDP) header. For a TCP packet, a 4-tuple including a source and destination IP address and a source and destination port numbers are said to uniquely identify a point-to-point connection that uses the protocol. For TCP packets, the filtering rules minimally consider the 4-tuple information and, in addition, they can contain information about the VLAN to which the packet belongs, the NIC (or, more generally, network interface circuitry) port on which the packet arrived, and the Ethernet address (SA) to which the packet is destined.

The lookup block 108 operates to match the protocol header to an internal identification ("tid," used by the interface device and the host) corresponding to a particular CB. In the FIG. 2 example the CB lookup for offloaded protocol connections is implemented with a TCAM memory, that allows location of a particular CB based on a key-bit vector, where the key and an entry agree in all the key bits where the corresponding entry mask bit is set. In addition, in the FIG. 2 example, the CB lookup for filtering rules is also implemented with the TCAM memory.

The TCAM provides the first matching entry (in one example, the entry with the lowest tid value), when there are multiple matching entries. As discussed below, by the organization of the TCAM, then, a "priority" of offloading versus filtering and/or among multiple filtering rules can be established. Furthermore, the TCAM is able to match the different filtering rules in parallel and perform filter rule lookup in a pipelined fashion, to provide lookup results every cycle after the pipeline startup delay.

In the FIG. 2 example, the lookup block 108 either provides a bit-vector representation of a TCP 4-tuple, which uniquely identifies the TCP connection, to a TCAM 110, and the TCAM 110 returns the tid for the unique TCP connection, or the lookup block 108 provides a bit-vector representation of an 8-tuple that additionally contains a protocol field, a VLAN identifier, a port index, and SA (Source MAC address). In the 4-tuple configuration the protocol type is considered to be implicit and has the value TCP-protocol. For the 8-tuple configuration, each of the tuples contained in entries of the filter rule portion of the TCAM can have "don't care" values, which are represented with a mask array. A lookup with "don't care" values present will only compare the TCAM bit entries where the mask has value of one, and in case of multiple matching entries will produce the index of the first entry that matches the "care values", i.e. the matching entry with the lowest index value.

Figure 3:
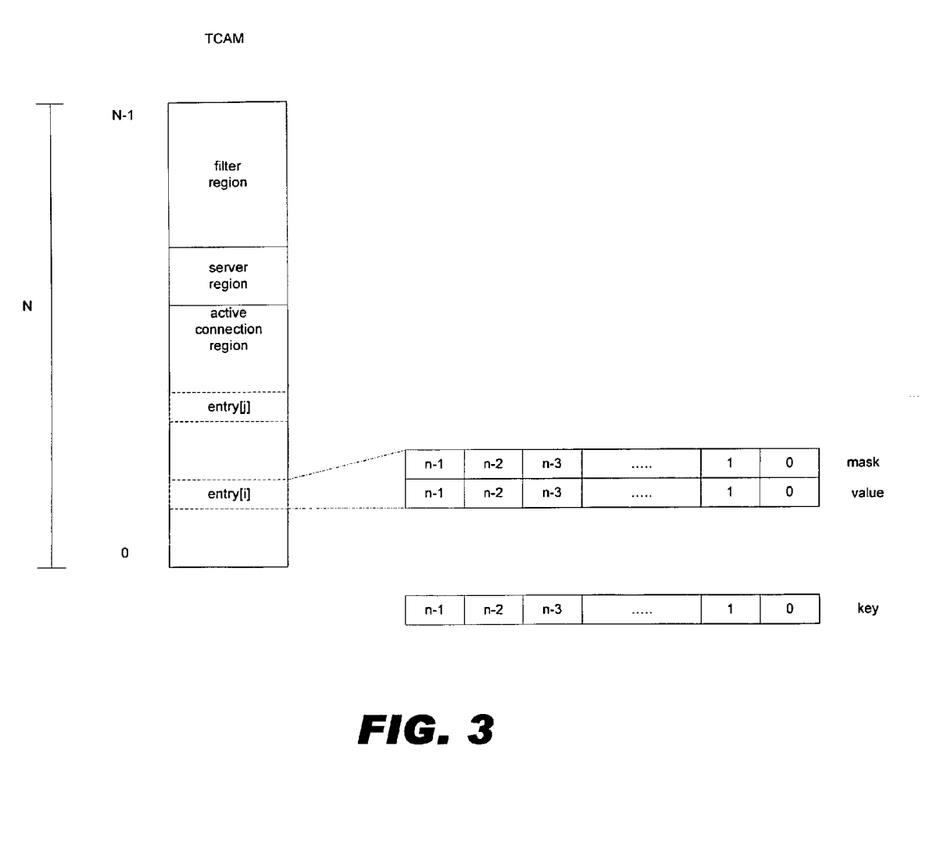
FIG. 3 illustrates the structure of a particular TCAM entry.
Figure 4:
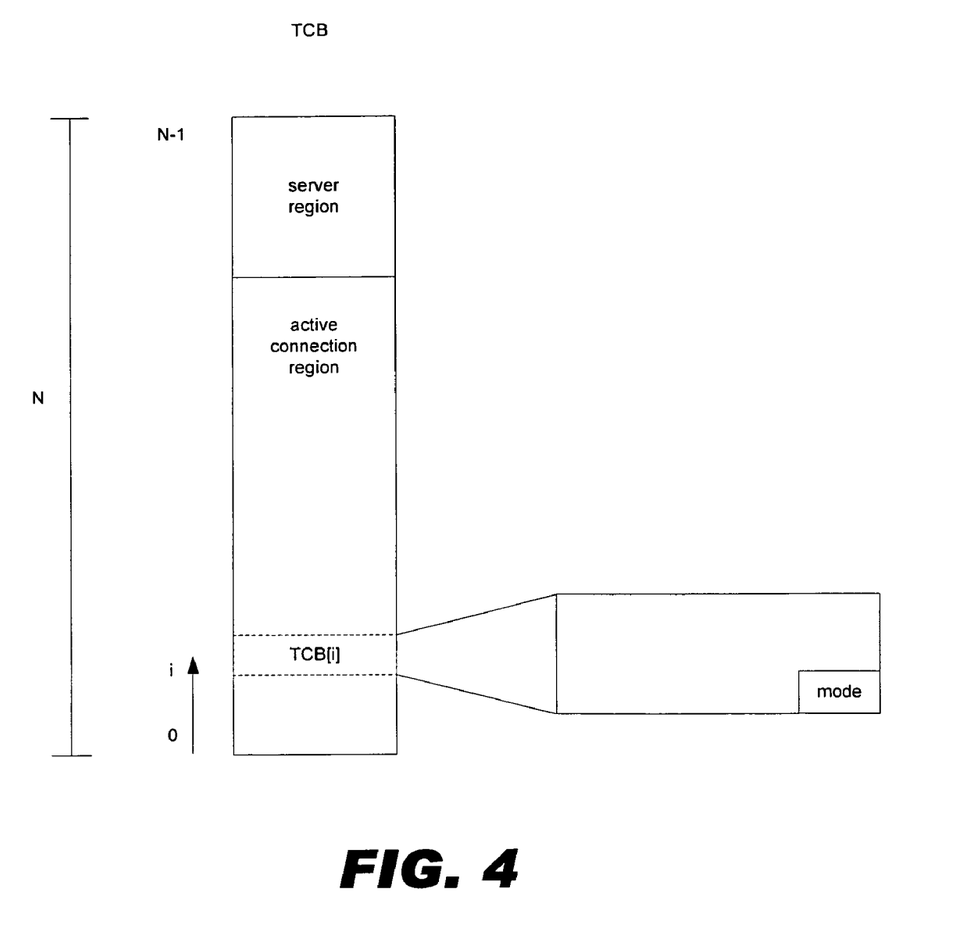
FIG. 4 illustrates the structure of a particular CB entry.

This last property (i.e., producing the index of the first entries that matches) is used to prioritize the entries within the TCAM as shown in FIG. 3. The "active connection" region contains pointer to the CB's for the offloaded connections, for example, the TCB (TCP Control Block) for the offloaded TCP connections. This region has the lowest index values. The "server" region contains pointers to the CB's for the listening TCP servers (SCB). Finally, the filter region contains pointers to the CB's for the filtering rules.

With this ordering, the tuple of an incoming TCP packet presented to the TCAM 110 will produce a tid pointing to a CB for an active connection or, possibly, a tid pointing to an SCB, if the TCP packet is a connect request (i.e., has the SYN flag set in the TCP header). Finally, a tuple that does not result in a hit in either the active or server regions may produce a hit in the filter region or, possibly, miss completely in the lookup, in which case the TCAM provides a no matching entry indication. In one example, a packet whose tuple does not hit any entry in the TCAM is passed to the host, i.e., has a default filtering action of accept. This behavior may be modified by including an entry in the last entry of the TCAM with none of the mask bits set, such that all packets whose tuple does not match any previous entry (i.e., any entry with a lower index value) will match this entry. The action corresponding to this entry can be set to reject or to any other desired default action.

Turning now away from the TCAM 110 specifically, the lookup block 108 provides the tid, received from the TCAM 110, to connection manager circuitry 112. (Furthermore, the packet headers are also provided down the pipeline.) The connection manager circuitry 112 manages the CB connection state and attributes. In the FIG. 2 example, the connection state and attributes are held in a Control Block (CB) 114. The connection manager 112 operates in concert with the payload command manager 116 to generate and provide payload commands to a payload manager block 118.

In particular, for offloaded connections, the connection manager provides the corresponding tid to the CB 114, and the CB 114 provides the current connection state and attributes for the offloaded connection (i.e., the connection to which the tid corresponds) back to the connection manager 112. Based on the current connection state and on attributes provided from the CB 114, the connection manager 112 determines that the packet corresponds to an offloaded connection, how to appropriately modify the connection state for that offloaded connection and provides, to the payload command manager 116, an indication of the modification to the connection state. Based on the indication of the modification, the payload command manager 116 issues one or more appropriate payload commands (PCMD) to the payload manager block 118 to cause data to be forwarded to the host or to be stored in a receive buffer, and create receive modulation events, as appropriate, to schedule delivery of the packet payload to the host.

For a CB corresponding to a filtering rule, the filtering action is stored as a field in the CB. If the action is to reject the packet, the connection manager 112 issues a PCMD to the payload manager 118 to flush the payload. When the filtering action is to pass the packet through to the host, an appropriate PCMD(s) is issued to cause the payload manger 118 to send the payload to the host and the headers are passed to the block 120 to form the header portion of the host packet. It is at this point, also, that editing of the destination IP address (LIP) and destination port number (LP) may occur: the action stored within the CB 114 indicates if the LIP and/or LP stored in the CB are to be written into the header in place of the address and port number heretofore stored there. The checksum is regenerated as part of the form packet 120 operation.

The 4-tuple configuration is used for filtering TCP packets. In one example, only the reject rule is supported such that a TCB entry is created for each TCP 4-tuple for which corresponding packets are to be rejected by the NIC. In another example with the 4-tuple configuration, a rule is created for each possible TCP 4-tuple and each TCB entry contains the pass/reject action to perform on packets having that 4-tuple.

The connection manager 112 writes the modified connection state and attributes back into the TCB 114. The read, modify and write of the connection state and attributes is done in an atomic operation.

The connection manager 112 provides an appropriate packet header for data transmission to a form packet block 120. For example, if the packet has been protocol-processed by the intelligent network interface circuitry (because, for example, the TCP 4-tuple in the incoming packet corresponds to a TCB entry being handled by the intelligent network interface circuitry), the packet header provided by the connection manager 112 may include a "command" that provides processing in the host with information about the packet and how it has been protocol processed by the intelligent network interface circuitry.

As another example, if the packet has not been protocol-processed by the intelligent network interface circuitry, the connection manager 112 provides the header that originally entered the arbiter 102, except that the appropriate filtering rule has been applied. Meanwhile, the payload manager block 118 provides the corresponding payload to the form packet block 120 (as discussed above, based on payload commands from the payload command manager 116). The form packet block 120 combines the packet header and corresponding payload into a packet to provide to the host. In the case where the appropriate filtering rule indicates that the packet is to be dropped, then the connection manager 112 flushes the header and, also, the payload command manger 116 provides a command to the payload manager block 118 to flush the corresponding payload.

It can thus be seen that packet filtering can be provided in circuitry closely associated with a host computer, but in a manner that does not greatly impact the processing resources of the host computer. Furthermore, in the case where intelligent network interface circuitry would already be providing a protocol offload function, implementation of packet filtering may be applied as an extension of processing used to match a particular packet with the state of the connection to which the packet belongs.

What is claimed is:

1. A method of operating network interface circuitry, wherein the network interface circuitry couples a host computer to a network to facilitate communication over the network between the host computer and a peer, the method comprising:
by the network interface circuitry,
receiving data from the peer via the network; and
processing at least a portion of the received data, including:
processing the at least a portion of the received data to determine an indication of a highest priority one of a plurality of actions to be performed by the network interface controller with respect to the received data, wherein
the plurality of actions include filtering received data and protocol processing of received data for connections between the host and a peer for which the protocol processing has been offloaded to the network interface circuitry by the host, and
the processing of the at least a portion of the received data includes presenting the at least a portion of the received data to lookup circuitry that is configured to automatically provide the indication of the highest priority action, associated with the received data, based not only on whether the portion of the received data presented to the lookup circuitry matches data associated with an indication of an action but also based on an order of the indications of the plurality of actions relative to each other in the lookup circuitry, the indications of protocol processing for connections that have been offloaded being located to indicate, when applicable to particular received data, a higher priority than the filtering actions;
and
performing the indicated highest priority one of the plurality of actions.

2. The method of claim 1, wherein:
automatically determining an indication of a highest priority one of a plurality of actions includes at least presenting an indication of characteristics of the at least a portion of the received data to a content-addressable memory, wherein the content addressable memory automatically provides an indication of the highest priority one of the plurality of actions.

3. The method of claim 1, wherein:
the received data includes at least one packet having a header portion and a payload portion; and
the header portion of each packet indicates characteristics of that packet.

4. The method of claim 1, wherein:
performing the indicated highest priority one of a plurality of actions includes, as appropriate, either performing the protocol processing for a connection indicated by a control block indicated by the highest priority action or applying a particular filtering rule to the received data including at least one of not providing the received data to the host and modifying the received data prior to providing the received data to the host.

5. The method of claim 1, wherein:
determining an indication of a highest priority one of a plurality of actions includes automatically determining a location, in the lookup circuitry, associated with the particular action; and
the action that is taken on the received data is the action with which the automatically determined location is associated.

6. The method of claim 1, wherein:
each of at least some of the plurality of actions is a filter rule;
each filtering rule has associated with it data characteristics for that filtering rule; and
automatically determining an indication of a highest priority one of a plurality of actions is based, at least in part, on processing characteristics of the received data relative to the associated data characteristics for the plurality of filtering rules.

7. The method of claim 6, wherein:
the characteristics of the received data are indicated by a characteristics indication portion of the received data; and
processing characteristics of the received data relative to the associated data characteristics for the plurality of filtering rules includes processing the characteristics indication portion of the received data relative to the associated data characteristics for the plurality of filtering rules.

8. The method of claim 7, wherein:
for each of at least some of the plurality of filtering rules, processing the characteristics indication portion of the received data relative to the associated data characteristics for that filtering rule includes applying a mask associated with that filtering rule to the characteristics indication portion of the received data and processing the masked characteristics indication portion relative to the associated data characteristics for that filtering rule.

9. A method of operating network interface circuitry, wherein the network interface circuitry is configured to handle protocol processing of connections offloaded from a host, with respect to data communication over a network between a peer and the host, the method comprising:
by the network interface circuitry, determining an indication of a highest priority one of a plurality of actions to be performed by the network interface controller with respect to the received data, the determining including
a) receiving data nominally from the peer via the network;
b) processing the received data such that,
b1) if the data is data of a connection that is offloaded from the host, determining an indication of an action to communicate with the peer according to the protocol and to pass data resulting therefrom to the host; and
b2) if the data is not data of a connection that is offloaded from the host and if there is at least one action that is a filtering rule associated with characteristics of the data, automatically determining an action that is a particular one of the filtering rules associated with characteristics of the received data to apply to the received data,
wherein the processing of the received data is based not only on whether the portion of the received data presented to the lookup circuitry matches data associated with an indication of an action but is also based on an order of the indications of the plurality of actions relative to each other in the lookup circuitry; and
applying the determined highest priority filtering rule to the data.

10. The method of claim 9, wherein:
the step of automatically determining the particular one of the indications of the plurality of actions includes presenting at least a portion of the received data to a content-addressable memory that includes the data associated with indications of the plurality of actions, wherein the organization and operation of the content-addressable memory is such to automatically determine the highest priority one of the indications of the plurality of actions at least as a result of an order of the indications of the plurality of actions relative to each other in the content-addressable memory.

11. The method of claim 10, wherein:
the content-addressable memory provides an indication of a location, in a collection of actions, of the particular action.

12. Network interface circuitry configured to couple a host computer to a network to facilitate communication over the network between the host and a peer, the network interface circuitry comprising:
circuitry configured to receive data from the network;
circuitry configured to process the received data to determine an indication of a highest priority one of a plurality of actions to be performed by the network interface controller with respect to the received data, wherein the processing includes presenting the at least a portion of the received data to lookup circuitry that is configured to automatically provide the indication of the highest priority action, associated with the received data, based not only on whether the portion of the received data presented to the lookup circuitry matches data associated with an indication of an action but also based on an order of the indications of the plurality of actions relative to each other in the lookup circuitry, wherein the actions include protocol processing with respect to a connection to which the received data belongs or filtering for received data which does not belong to a connection whose protocol processing is being handled by the network interface circuitry; and
circuitry configured to provide, to the host computer, the received data having the particular indicated highest priority action applied,
wherein the circuitry configured to provide, to the host computer, the received data having the indicated action applied, is configured to selectively block the received data from being provided to the host computer based at least in part on the indicated particular action being a filtering rule applicable to the received data.

13. The method of claim 1, wherein:
the lookup circuitry includes a content-addressable memory that includes the data associated with indications of the plurality of actions, wherein the at least a portion of the received data is presented to the content-addressable memory, and a corresponding result from the content-addressable memory is the indication of the highest priority one of a plurality of actions at least as a result of an order of the indications of the plurality of actions relative to each other in the content-addressable memory.

14. The method of claim 13, wherein:
the content-addressable memory is configured to provide an index of a first location in the content addressable memory whose content matches the portion of the received data presented to the content-addressable memory.

15. The method of claim 14, wherein:
the content-addressable memory is configured, for at least some of the locations, to treat a part of the at least portion provided to the lookup circuitry as "don't care" such that any value for this part will match.

16. The method of claim 1, wherein the filtering rules including filtering rules to, when applied, selectively cause some of the received data to not be passed to the host.

17. The method of claim 1, wherein:
the lookup circuitry is configured to, in determining whether a particular action is applicable to the received data, treat a part of the at least portion provided to the lookup circuitry as "don't care" such that any value for this part will match.

18. A method of operating network interface circuitry, wherein the network interface circuitry couples a host computer to a network to facilitate communication over the network between the host computer and a peer, the method comprising:
by the network interface circuitry,
receiving data from the peer via the network; and
processing at least a portion of the received data, including:
processing the at least a portion of the received data to determine an indication of a highest priority one of a plurality of actions to be performed by the network interface controller with respect to the received data, wherein
the plurality of actions include filtering received data and protocol processing of received data for connections between the host and a peer for which the protocol processing has been offloaded to the network interface circuitry by the host, and
the processing of the at least a portion of the received data includes presenting the at least a portion of the received data to lookup circuitry that is configured to automatically provide the indication of the highest priority action, associated with the received data, the indications of protocol processing for connections that have been offloaded indicating, when applicable to particular received data, a higher priority than the filtering actions; and
performing the indicated highest priority one of the plurality of actions.

19. The method of claim 18, wherein:
automatically determining an indication of a highest priority one of a plurality of actions includes at least presenting an indication of characteristics of the at least a portion of the received data to at least one content-addressable memory, wherein the at least one content addressable memory automatically provides an indication of the highest priority one of the plurality of actions.

20. The method of claim 18, wherein:
the received data includes at least one packet having a header portion and a payload portion; and
the header portion of each packet indicates characteristics of that packet.

21. The method of claim 18, wherein:
performing the indicated highest priority one of a plurality of actions includes, as appropriate, either performing the protocol processing for a connection indicated by a control block indicated by the highest priority action or applying a particular filtering rule to the received data including at least one of not providing the received data to the host and modifying the received data prior to providing the received data to the host.

22. The method of claim 18, wherein:

determining an indication of a highest priority one of a plurality of actions includes automatically determining a location, in the lookup circuitry, associated with the particular action; and the action that is taken on the received data is the action with which the automatically determined location is associated.

23. The method of claim 18, wherein:

each of at least some of the plurality of actions is a filter rule;

each filtering rule has associated with it data characteristics for that filtering rule; and automatically determining an indication of a highest priority one of a plurality of actions is based, at least in part, on processing characteristics of the received data relative to the associated data characteristics for the plurality of filtering rules.

24. The method of claim 23, wherein:

the characteristics of the received data are indicated by a characteristics indication portion of the received data; and processing characteristics of the received data relative to the associated data characteristics for the plurality of filtering rules includes processing the characteristics indication portion of the received data relative to the associated data characteristics for the plurality of filtering rules.

25. The method of claim 24, wherein:

for each of at least some of the plurality of filtering rules, processing the characteristics indication portion of the received data relative to the associated data characteristics for that filtering rule includes applying a mask associated with that filtering rule to the characteristics indication portion of the received data and processing the masked characteristics indication portion relative to the associated data characteristics for that filtering rule.

\* \* \* \* \*